June 10, 1958    F. KESSELRING ET AL    2,838,634
METHOD FOR LIMITING EXCESS CURRENTS IN DIRECT
OR ALTERNATING CURRENTS MAINS
Filed March 9, 1954
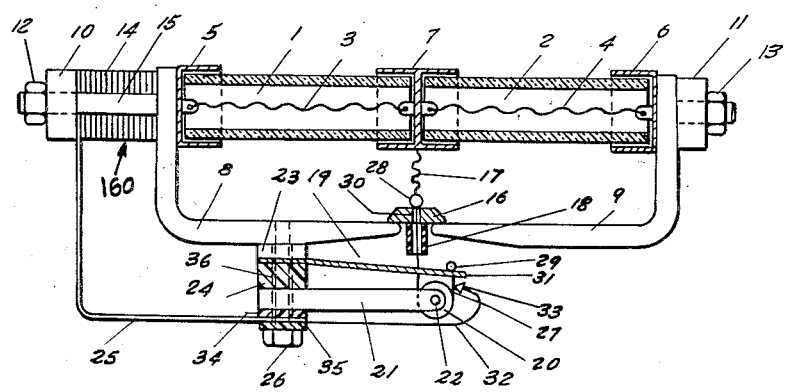
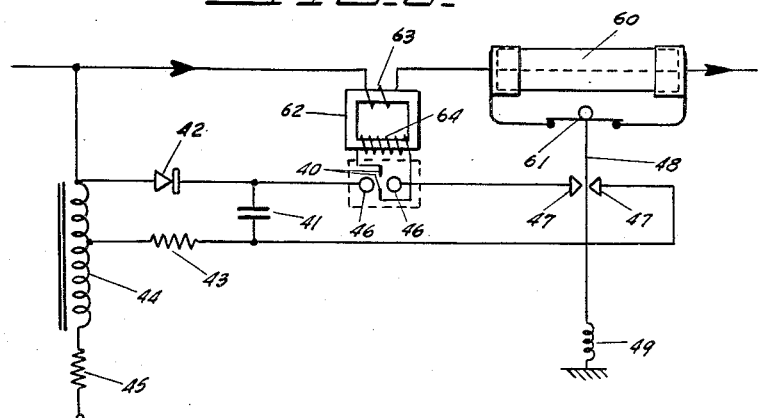
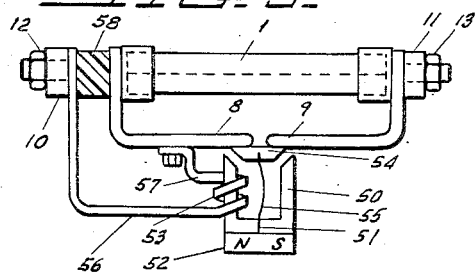
INVENTORS
FRITZ KESSELRING
WALTER BAER
BY
Ostrolenk and Faber
ATTORNEYS

United States Patent Office 2,838,634
Patented June 10, 1958

2,838,634

METHOD FOR LIMITING EXCESS CURRENTS IN DIRECT OR ALTERNATING CURRENTS MAINS

Fritz Kesselring, Zollikon Zurich, and Walter Baer, Zurich, Switzerland, assignors to FKG Fritz Kesselring Geratebau A. G., Bachtobel-Weinfelden, Switzerland, a corporation of Switzerland Application March 9, 1954, Serial No. 415,032

14 Claims. (Cl. 200—114)

Our invention relates to a novel method of rapidly interrupting a circuit under fault conditions.

We provide a main current path which carries the major portion of the normal load. A fuse or circuit breaker or another device which is responsive to fault current is then placed in parallel to the main current path. Hereinafter, we will refer to this element responsive to fault current as a "cut-out."

A switching means is then provided in the main current path which is constructed to be closed when normal current flows thus short-circuiting the cut-out. A second means which is made to be responsive to a fault current is then provided to open the switching means in the main current path thus forcing the fault current to flow through the cut-out.

The cut-out does not have to carry the rated current of the system since it is shorted out by the main current path when rated current is flowing, hence, it can be rated at a considerably lower value.

It is known that the maximum value of a short circuit current may be limited both in low and high voltage current mains by the use of so called quick break fuses provided the rated current of the cut-outs is sufficiently low in comparison with the short circuit current to be expected at the location of the cut-outs.

The following values may be cited as examples. With an amplitude value of the short circuit current of 51 ka., a cut-out with a rated current of 100 a. would yield a fusion current peak (reduced highest value of the short circuit current) of 14.5 ka. However, if a cut-out with a 10 a. rated current should be inserted, under similar conditions, the fusion current peak would be about 2.2 ka. This shows that an effective decrease in the highest value of the short circuit current together with a corresponding decrease in the duration of the flow of the short circuit current can only be attained by using cut-outs with a sufficiently low rated current. However, this considerably limits the possibilities of using cut-outs to decrease short circuit currents.

The present invention consists of an arrangement to limit excess currents in direct or alternating current mains, whereby it is possible, on any rated current, for cut-outs, at their location, to exert a decreasing effect on the short circuit current. It consists of at least one cut-out of suitable dimensions for the rated voltage and a fraction of the rated current and at least one bridge switch for this cut-out under normal working conditions whereby the impedance of the switch branch is such that the current normally flowing through the cut-out is less than the rated current of the cut-out, and in which means are provided to interrupt the contact at the switch at most 0.5 ms. after the occurrence of the short circuit current, and further consists in using a cut-out of suitable dimensions and developing the parallel connection-cut-out bypass switch in such a maner that at the moment the contact is interrupted, the potential drop per interruption point of the switch reaches at most 15 v. and the electrical power of the switch is always greater than the voltage occurring at the cut-out.

Since, in the case of quick break fuses for limiting short circuit currents a direct current extinction is always involved, the arrangement can be used for direct or alternating current circuits. The realization of the invention is explained in some detail below.

First of all, according to this invention, one must be sure that the cut-out does not fuse under normal working conditions. This can be insured by seeing that the parallel path on which the bypass switch is located has a sufficiently low impedance. It is above all necessary to use a sufficiently high contact pressure and suitable materials for the contacts, such as silver or palladium, to insure a sufficiently low contact resistance.

Further, according to this invention, the potential drop at the cut-out, including the additional potential drop at the parallel connection at the moment when the current of the switch branch is commuted to the cut-out should not exceed 15 v. per point of interruption, as otherwise sparks would occur at the switch contact, which would involve a corresponding decrease in disruptive strength. To avoid increases in voltage due to oscillations, the inductivity of the loop formed by the wire of the cut-out and the switch branch must be as low as possible and the capacity of the switch contacts must be as high as possible.

It is furthermore desirable that the bypass switch should start to open immediately after the excess current occurs, or at most within $0.5 \times 10^{-3}$ s. Depending on the type of bypass switch, the rate of opening must be determined in such a way that the breakdown voltage at the switch is always greater than the voltage at the cut-out at the time of the disconnection (process). To insure that the excess voltage at the disconnection remains low, it is desirable to use fuse leads with stepwise or constantly variable cross-sections whereby it is possible to obtain that the excess voltage in the inductive current circuits does not exceed approximately 1.5 times the value of the amplitude of the phase voltage. The switch may be an air break switch with one, or in the case of higher rated voltages particularly, with several points of interruption arranged in series. In the case of high voltages, it may be desirable to arrange the interruption points in a particularly suitable medium, such as producer gas or oil, or to use vacuum switches.

To attain the rapid disconnection and the high switch rate required, a series of possibilities are available, some of which will be described in more detail below.

The actual disconnecting may depend on the instantaneous value of the increasing short circuit current or on its slope. Under certain conditions, it may be desirable to effect the disconnection only when both the instantaneous value of the short circuit current and its slope have reached certain prescribed figures.

Figures 1 and 2 show two methods of carrying out the invention as examples, in which the bridging switch is activated by a power accumulator, in which case, in the method shown in Figure 1, the short circuit current itself is used to disconnect the power accumulator, whereas in the method shown in Figure 2, the power accumulator is disengaged by a power independent of the short circuit current.

Figure 3 shows an example of the invention with electromagnetic activation of the bridging switch by the short circuit current itself.

In Figure 1, numbers 1 and 2 each represent one quick break fuse for half the rated voltage, 3 and 4 are the corresponding fuse conductors, 5 and 6 are the outer terminal caps, and 7 is a connecting piece placed in the center, with which the ends of fuse conductors 3 and 4 are conductively connected. 8 and 9 represent two strong electric conductor clamps which are connected with terminal caps 5 and 6. Terminal caps 10 and 11 are conductively connected with caps 5 and 6 by means of bolts 12 and 13, which are, at the same time, used to fasten clamps 8 and 9.

A bundle of laminated iron plates 14 is arranged on conductor 15. The bridging switch has a current bridge 16, which is a good electric and magnetic conductor and is connected by means of flexible conductor 17 with the middle cap 7 of cut-outs 1 and 2. An insulating tube 18 is attached to the lower side of contact 16. 19 is an essentially triangular shaped plate spring. 20 is an adjustable pulley mounted in hanger 21. Axis 22 of pulley 20 is formed as an eccentric so that the position of pulley 20 can be adjusted. 23 is an electrically conductive intermediate piece, and 24, 34 and 35 are intermediate insulating pieces. 25 is an electrically conductive feed to hanger 21. Parts 23, 19, 24, 21, 34, 25 and 32 are fastened to clamp 8 by means of screw 26 passing through small insulating tube 36. 27 is a thin wire of high strength, at each end of which small balls 28 and 29 are fastened.

Contact 16 and spring 19 are connected with each other mechanically by means of wire 27 so that in the pictured position, spring 19 is stretched downwards. Opening 30 in contact 16 and opening 31 in spring 19 are used to attach wire 27 to contact 16 and to the spring. 32 is a thin plate spring which has a wedge shaped contact 33 at its forward end which presses against wire 27 with the indicated pressure.

This method works as follows. Under normal working conditions, the current flows generally from terminal 10, over bolt 15, clamp 8, contact 16 and clamp 9 to terminal 11.

The impedance of this path is so low that the current flowing in fuse conductors 3 and 4 does not exceed the rated current of fuses 1 and 2. At the induction coil 160, consisting of conductor 15 and the bundle of iron plates 14, that is between terminal 10 and clamp 8, the potential drop is so slight that the current flowing over path 25, 32, 33, 27, 16 and 9 and contact 13 does not affect the strength of wire 27. However, as soon as a short circuit occurs, the slope of the current and thereby the voltage of induction coil 160 increases 10 to 30 fold which almost instantaneously creates at the wedge shaped contact the fuse voltage of the wire 27 and the wire 27 separates. This releases spring 19, which had previously been stretched and at the same time, effected the contact between contact 16 and clamps 8 and 9 by means of wire 27.

Spring 19 strikes the lower end of insulating tube 18 which very rapidly raises contact 16. At this moment, the primary current, which up to now has been flowing over clamp 8, is commuted to fuse conductors 3 and 4. As anticipated, at this moment, the potential drop at fuse conductors 3 or 4, including the potential drop at the loop formed by clamps 8 and 9 should not exceed a prescribed value of 15 v. at most.

To insure an equalized distribution of voltage over interruption points 8, 16 and 9, 16, flexible connection 17 is used between center cap 7 and contact 16. After 0.5 . . . 1 ms. fuse conductors 3 and 4 melt. Luminous arcs result, which are so strongly cooled that the current is interrupted in another 0.5 . . . 1 ms. Contact 16 must move so rapidly that during the entire process of switching off the cut-out, the strike-over voltage at the contacts is always greater than the voltage at the cut-out.

In summary, the embodiment of Figure 1 operates as follows:

(1) A fault appears on the main circuit.

(2) The voltage induced in the inductor coil 15 due to the rate of rise of current in the main circuit causes current to flow through low impedance path 25, 32, 33, 27, 18 and 8.

(3) The above current reaches a value high enough to melt fuse wire 27 thus releasing deflected spring 19 and allowing contact 16 to be moved out of engagement with conductors 8 and 9.

(4) Deflected spring 19 flexes upward to a position of least energy and strikes insulated protrusion 18 of contact 16 thus rapidly disengaging contact 16 from conductors 8 and 9.

(5) With the main current conducting circuit now open, the fault current must now flow through low capacity fuses 1 and 2 and fault current interruption is achieved rapidly.

Depending on the normal working voltage type of cut-out and the current to be cut off, accelerations 5,000 . . . 50,000 times greater than the acceleration due to gravity must be used to activate the contact 16. If switch materials of higher disruptive strength are used, such as producer gas or oil, and to an even greater degree, if a vacuum switch is used, considerably lower accelerations suffice.

In the arrangement shown in Figure 1, contact 16 is activated by a power accumulator, stretched spring 19, in which case the disconnecting of the power accumulator, that is, the power used to burn through wire 27, is supplied by the short circuit current.

In the method illustrated in Figure 2, only one cut-out 160 and a single pole bypass switch 61 is shown. Transformer 62 has a high turns ratio of secondary coil 64 to primary coil 63. The ends of secondary coil 63 placed in spark gap 40. 41 is a condenser which is charged by means of rectifier 42 and resistance 43. Transformer 44 is used as a source of power, and is connected in series with resistance 45. Fuse wire 48 passes between electrodes 47, 47 and is connected at one end with normally open contact 61, whereas the other end is fastened to a solid point. Wire 48 is held rigid by tension spring 49.

For the sake of economy, transformer 44 can be an auto-transformer as shown in the figure. The voltage supply for the transformer is shown as the voltage supply of the protected system. Spark gap 40 contains electrodes 46 which will pass current from transformer 44 when spark gap 40 is ionized by secondary winding 64 of transformer 62.

Contact 61 is biased to be normally open by means of an external bias or due to its own elastic properties. Figure 2 shows contact 61 maintained in the closed position by means of wire 43.

The embodiment of Figure 2 operates as follows. Under a normal load, the current flows over primary coil 63 and contact 61. Transformer 44 charges condenser 41 through rectifier 42 and resistance 43. If a short circuit current now occurs, a relatively high voltage is induced into secondary coil 64 which results in the ionization of spark gap 40, and condenser 41 is discharged over spark gap 46 and the pair of electrodes 47. The discharge current immediately heats wire 48 between electrodes 47 so that wire 48 is fused at this point and bypass switch 61 is moved upwards by its inherent spring. The current is commuted to cut-out 60 and is there disconnected.

Tests have shown that the activation of the two spark gaps 40 occurs within $10^{-6}$ s. or less.

A condenser of, let us say, 50 mf. charged with 1000 v. will bring a 0.2 mm. diameter piano wire 48 to the point of fusing in less than $10^{-4}$ s. Electrodes 47 may be located either at a very slight distance from wire 48, or else, either or both of the electrodes may touch wire 48 under slight pressure without, in any way noticeably increasing the time required for it to fuse. As a result of the high discharging current which generally exceeds 1000 a., wire 48 is melted and vaporized almost instantaneously.

It will also be seen that in the method illustrated in Figure 2, the bypass switch 61 is activated by a power accumulator, namely the mechanical energy stored in flexible bypass switch 61, whereas, on the other hand, the release of the power accumulator is caused by the power of the discharge current of condenser 41 independently of the short circuit current. In this case, the disconnecting generally occurs in three stages: with the start of the short circuit current, transformers 62, 63 and 64 supply the control, or in this case the sparking energy for spark gap 40. The energy for the disconnecting of the power accumulator, that is, for fusing wire 48 is at first stored in condenser 41 in the form of electrical energy and, after activation of the spark gap 40, is transformed at least partly into thermal energy between electrodes 47, by means of which wire 48 is fused. At this moment, the mechanical energy stored by flexible bypass switch 61 is released and causes the interruption in the branch of the main bypass circuit.

Figure 3 shows a third embodiment of our invention. This figure shows, similar to the embodiment of Figure 1, a fuse 1, electrical conductors 8 and 9, terminals caps 10 and 11, and bolts 12 and 13. 50 is a U-shaped magnetic system, notched at point 51. 52 is a permanent magnet. 53 is a primary current coil with lead-in wires 56 and 57. 54 is the anchor which serves as a current bridge at the same time. 55 is a spring with flexing qualities by means of which contact 54 engages clamps 8 and 9. Lead-in wire 56 and clamp 8 are insulated from each other by insulator 58. The current flows from terminal 10 over conductor 56, coil 53, conductor 57 and clamp 8, rotor 54 and clamp 9 to terminal 11.

At the moment when the short circuit current reaches a prescribed value, the magnetic attraction of magnet 50 is greater than the counteracting force of spring 55, contact 54 moves downwards, spring 55 bends to the right, which decreases its counteracting force considerably. In the end position, contact 54 is held (fast) by the flux due to permanent magnet 52. The commutating of the current to the cut-out occurs in exactly the same manner as in the preceding examples. In this method, the energy for the activation of the bypass switch is supplied by the short circuit current itself. However, it would be possible to use a current derived from this for the activation.

The disconnecting system according to Figure 2 may also be carried out by the method shown in Figure 3 whereby instead of the pair of electrodes 47 (see Figure 2), coil 53 of magnetic system 50 is connected so that contact 54 takes the place of flexible bypass switch 61. In this manner, it can be arranged that magnetic system 50 be activated independently of the magnitude of the short circuit current by means of the discharge current of condenser 41 (Figure 2) at any magnitude. Experiments have shown that even greater accelerations of contact 54 may be obtained in this manner.

Under certain conditions, it may also be desirable to arrange fuses 1 and 2 or merely their fuse elements 3 and 4 as exchangeable. Then, if wire 27 is replaced at the same time after disconnecting a short circuit, the method can easily be put into operation again. To the extent that one wishes to use the methods of this invention as rapidly as possible and several times in succession, it may be desirable to arrange such appliances on a drum so that, after one disconnection, the next appliance is automatically inserted into the current circuit.

Care must be taken to avoid single pole interruptions in multiphase systems by using known means so that with the disconnecting of one phase, the appliances in the other phases are activated or at least so that the excess current switch, which is generally included in such methods, is disconnected. To avoid activation of the method, for instance by the surge current of the transformers, they can be bridged over by means of an opening meter which is not disconnected until after the dying out of the surge current, but of course, before the secondary side of the transformer is disconnected.

Methods according to the invention may be applied to low or high voltage distribution networks of any rated strength and limit the peak value of the short circuit current and the duration of the current flow to fractions of the values that would be reached without the insertion of such methods. The considerably lower thermal and dynamic requirements are a great technical and economic advantage and moreover, the field of usefulness of quick break fuses is extended to rated currents of any magnitude without thereby affecting their current limiting effect.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claims.

Having now particularly described and ascertained the nature of our said invention and in what manner the same is to be performed, we declare that what we claim is:

1. In a circuit protecting device comprising an element responsive to fault current; said fault current responsive element having a voltage rating corresponding to the voltage of the protected system and a current rating below the current rating of the protected system; a by-pass circuit having a switch connected in parallel to said element responsive to fault current; said by-pass circuit constructed to carry a large part of the rated current of the protected system when said switch is closed; said switch having an insulated protrusion positioned to be under impact with a spring; a fusible element in tension riding over an adjustably fixed pulley; said fusible element having one end maintained to said switch in the closed position and the other end to maintain said spring in a deflected position; an inductor responsive to rate of rise of fault current in the protected system having a parallel auxiliary circuit which includes at least a part of said fusible element; the impedance of said auxiliary circuit being such that the current flowing in said auxiliary circuit upon a fault in the protected system will melt said fusible element thus releasing said deflected spring to strike said switch insulated protrusion to affect interruption of said by-pass circuit said switch in less than 0.5 millisecond after the occurrence of said short circuit.

2. In a circuit protecting device comprising an element responsive to fault current; said fault current responsive element having a voltage rating corresponding to the voltage of the protected system and a current rating below the current rating of the protected system; a by-pass circuit having a switch connected in parallel to said element responsive to fault current; said by-pass circuit constructed to carry a large part of the rated current of the protected system when said switch is closed; said switch having an insulated protrusion positioned to be under impact with a spring; a fusible element; said fusible element constructed to maintain said switch in the closed position and maintain said spring in a deflected position; an inductor responsive to rate of rise of fault current in the protected system having a parallel auxiliary circuit which includes at least a part of said fusible element; the impedance of said auxiliary circuit being such that the current flowing in said auxiliary circuit upon a fault in the protected system will melt said fusible element thus releasing said deflected spring to strike said switch insulated protrusion to affect interruption of said by-pass circuit by said switch in less than 0.5 millisecond after the occurrence of said short circuit.

3. In a circuit protecting device comprising an element responsive to fault current; said fault current responsive element having a voltage rating corresponding to the voltage of the protected system and a current rating below the current rating of the protected system; a by-pass circuit having a switch connected in parallel to said element responsive to fault current; said by-pass circuit constructed to carry a large part of the rated current of the protected system when said switch is closed; said switch having an insulated protrusion positioned to be under impact with a spring; a fusible element; said fusible element constructed to maintain said switch in the closed position and maintain said spring in a deflected position; electromagnetic means responsive to rate of rise of fault current in the protected system said electromagnetic means constructed to melt said fusible element upon a fault in the protected system thus releasing said deflected spring to strike said switch insulated protrusion to affect interruption of said by-pass circuit by said switch in less than 0.5 millisecond after the occurrence of said short circuit.

4. In a circuit protecting device comprising an element responsive to fault current; said fault current responsive element having a voltage rating corresponding to the voltage of the protected system and a current rating below the current rating of the protected system; a by-pass circuit having a switch connected in parallel to said element responsive to fault current; said by-pass circuit constructed to carry a large part of the rated current of the protected system when said switch is closed; said switch having an insulated protrusion positioned to be under impact with a spring; a fusible element; said fusible element constructed to maintain said switch in the closed position and maintain said spring in a deflected position; electromagnetic means responsive to rate of rise of fault current in the protected system; said electromagnetic means constructed to melt said fusible element upon a fault in the protected system, thus releasing said deflected spring to strike said by-pass switch insulated protrusion to affect interruption of said by-pass circuit by said switch.

5. In a circuit protecting device comprising a fuse, said fuse having a voltage rating corresponding to the voltage of the protected system and a current rating below the current rating of the protected system; a by-pass circuit having a switch connected in parallel to said fuse; said by-pass circuit constructed to carry a large part of the rated current of the protected system when said switch is closed; said switch having an insulated protrusion positoned to be under impact with a spring; a fusible element; said fusible element constructed to maintain said switch in the closed position and maintain said spring in a deflected position; an inductor responsive to rate of rise of fault current in the protected system having an auxiliary circuit which includes at least a part of said fusible element; the impedance of said auxiliary circuit being such that the current flowing in said auxilary circuit upon a fault in the protected system will melt said fusible element thus releasing said deflected spring to strike said switch insulated protrusion to affect interruption of said by-pass circuit by said switch in less than 0.5 millisecond after the occurrence of said short circuit.

6. In a circuit protecting device comprising an element responsive to fault current; said fault current responsive element having a voltage rating corresponding to the voltage of the protected system and a current rating below the current rating of the protected system; a by-pass circuit having a switch connected in parallel to said element responsive to fault current; said by-pass circuit constructed to carry a large part of the rated current of the protected system when said switch is closed; said switch having a disengaging bias and an engaging latch; said engaging latch being a fusible element under tension having one end attached to said switch and the other end rigidly fastened to maintain said switch in a closed position; an auxiliary circuit comprising in series a voltage source, a spark gap and at least a section of said fusible element; an electromagnetic means responsive to the rate of rise of fault current in the protected system to cause conduction in said spark gap, said auxiliary voltage source to then pass current through said series section of said fusible element, said switch disengaging bias to open said switch when said fusible element melts, said auxiliary circuit impedance to be such that said fusible element will melt and said switch will open in less than 0.5 millisecond after the occurrence of said fault current.

7. In a circuit protecting device comprising an element responsive to fault current; said fault current responsive element having a voltage rating corresponding to the voltage of the protected system and a current rating below the current rating of the protected system; a by-pass circuit having a switch connected in parallel to said element responsive to fault current; said by-pass circuit constructed to carry a large part of the rated current of the protected system when said switch is engaged; said switch having a disengaging bias and an engaging latch; said engaging latch being a fusible element; an auxiliary circuit comprising in series a voltage source, a spark gap and at least a section of said fusible element; an electromagnetic means responsive to the rate of rise of fault current in the protected system to cause conduction in said spark gap, said auxiliary voltage source to then pass current through said series section of said fusible element, said switch disengaging bias constructed to disengage said switch when said fusible element melts, said auxiliary circuit impedance to be such that said fusible element will melt and said switch will disengage in less than 0.5 millisecond after the occurrence of said fault current.

8. In a circuit protecting device comprising an element responsive to fault current; said fault current responsive element having a voltage rating corresponding to the voltage of the protected system and a current rating below the current rating of the protected system; a by-pass circuit having a switch connected in parallel to said element responsive to fault current; said by-pass circuit constructed to carry a large part of the rated current of the protected system when said switch is engaged; said switch having a disengaging bias and an engaging latch; said engaging latch being a fusible element; an electromagnetic means responsive to the rate of rise of fault current in the protected system; a voltage source; means to connect said voltage source to said fusible element; said electromagnetic means constructed to energize said connecting means to cause said voltage source to pass current through said fusible element, said switch disengaging bias constructed to disengage said switch when said fusible element melts, said fusible element constructed to melt to allow said switch to disengage in less than 0.5 millisecond after the occurrence of said fault current.

9. In a circuit protecting device comprising a circuit breaker; said circuit breaker having a voltage rating corresponding to the voltage of the protected system and a current rating below the current rating of the protected system; a by-pass circuit having a switch connected in parallel to said circuit breaker; said by-pass circuit constructed to carry a large part of the rated current of the protected system when said switch is closed; said switch having an opening bias and a closing bias; said closing bias being a fusible element; an electromagnetic means responsive to the rate of rise of fault current in the protected system; a voltage source; means to connect said voltage source to said fusible element; said electromagnetic means constructed to energize said connecting means to cause said voltage source to pass current through said fusible element; said switch opening bias constructed to open said switch when said fusible element melts, in less than 0.5 millisecond after the occurrence of said fault current.

10. In a circuit protecting device comprising an element responsive to fault current; said faul current responsive element having a voltage rating corresponding to the voltage of the protected system and a current rating below the current rating of the protected system; a by-pass circuit having an interruption point connected in parallel to said element responsive to fault current; said by-pass circuit constructed to carry a large part of the rated current of the protected system when said interruption point is bridged by a by-pass switch; said by-pass switch having a disengaging bias and an engaging latch; said engaging latch being a fusible element under tension having one end attached to said by-pass switch and the other end rigidly fastened; an auxiliary circuit comprising in series a voltage source, a spark gap and at least a section of said fusible element; an electromagnetic means responsive to the rate of rise of fault current in the protected system to cause conduction in said spark gap, said auxiliary voltage source to then pass current through said series section of said fusible element, said by-pass switch disengaging bias to disengage said by-pass switch when said fusible element melts a voltage source; means to connect said voltage source to said fusible element, said electromagnetic means constructed to energize said connecting means to cause said voltage source to pass current through said fusible element.

11. In a circuit protecting device comprising; an element responsive to fault current, said element having a current rating below the current rating of said protected circuit and a voltage rating equivalent to the voltage rating of said protected circuit, a by-pass circuit connected in parallel to said element responsive to fault current, said by-pass circuit constructed to carry at least a portion of the rated current of said protected circuit, said by-pass circuit having a switch, said switch having an engaged and a disengaged position; a bias to maintain said switch in said engaged position, said engaging bias being latched by a fusible element, means to move said switch to said disengaged position when said engaging bias fusible element latch is defeated, electromagnetic means constructed to generate a voltage when a fault appears on said protected system, said voltage to cause melting of said fusible element latch to defeat said engaging bias.

12. In a circuit protecting device comprising an element responsive to fault current; said fault current responsive element having a voltage rating corresponding to the voltage of the protected system and a current rating below the current rating of the protected system; a by-pass circuit having an interruption point connected in parallel to said element responsive to fault current; a bridging contact; said by-pass circuit constructed to carry a large part of the rated current of the protected system when said interruption point is bridged by a bridging contact; said bridging contact having an engaged and a disengaged position; said bridging contact having an insulated protrusion positioned to be under impact with a leaf spring; a fusible wire in tension riding over an adjustably fixed pulley; said fusible wire having one end maintained to said bridging contact to keep said bridging contact in said engaged position and the other end to maintain said leaf spring in a deflected position; an inductor responsive to rate of rise of fault current in the protected system; said inductor constructed to have the current conductor of said protected circuit as its coil, and a magnetic core consisting of iron laminations stacked to surround said current conductor; an auxiliary circuit connected in parallel to said inductor which includes at least a part of said fusible element; the impedance of said auxiliary circuit being such that the current flowing in said auxiliary circuit upon a fault in the protected system will melt said fusible element thus releasing said deflected leaf spring to strike said bridging contact insulated protrusion to drive said bridging contact to said disengaged position in less than 0.5 millisecond after the occurrence of said short circuit.

13. In a circuit protecting device comprising an element responsive to fault current; said fault current responsive element having a voltage rating corresponding to the voltage of the protected system and a current rating below the current rating of the protected system; a by-pass circuit having an interruption point connected in parallel to said element responsive fault current; said by-pass circuit constructed to carry a large part of the rated current of the protected system when said interruption point is bridged by a contact; said contact having a disengaging bias and an engaging latch; said engaging latch being a fusible element under tension having one end attached to said contact and the other end rigidly fastened; an auxiliary circuit comprising in series a voltage source, a spark gap and at least a section of said fusible element; a transformer having a primary and a secondary, said transformer primary connected in series with said protected circuit, said transformer secondary connected to cause ionization in said spark gap when fault current flows in said protected circuit to then cause said spark gap to break down and allow current passage through said series section of said fusible element, said by-pass switch disengaging bias constructed to disengage said contact when said fusible element melts, said auxiliary circuit impedance to be such that said fusible element will melt and said contact will disengage in less than 0.5 millisecond after the occurrence of said fault current.

14. In a circuit protecting device comprising; an element responsive to fault current, said element having a current rating below the current rating of said protected circuit and a voltage rating equivalent to the voltage rating of said protected circuit, a by-pass circuit connected in parallel to said element responsive to fault current, said by-pass circuit constructed to carry at least a portion of the rated current of said protected circuit, said by-pass circuit having a switch, said switch having an engaged and a disengaged position; a bias to maintain said switch in said engaged position means to move said switch to said disengaged position when said engaging bias is defeated, electromagnetic means constructed to generate a voltage when a fault appears on said protected system, said voltage to cause defeat of said bias, said switch being a high speed device constructed to be moved to said disengaged position in the order of $0.5 \times 10^{-3}$ seconds to maintain the recovery voltage across said switch to less than the flash over voltage while said switch is being moved to said disengaged position, said engaging bias including a fusible element, said bias being defeated when said fusible element is melted.

References Cited in the file of this patent

UNITED STATES PATENTS

| | | |
|---|---|---|
| 1,159,547 | Tate | Nov. 9, 1915 |
| 1,211,967 | Schweitzer | Jan. 9, 1917 |
| 1,294,621 | Conrad | Feb. 18, 1919 |
| 1,833,173 | Murray | Nov. 24, 1931 |
| 1,850,213 | Murray | Mar. 22, 1932 |
| 1,930,485 | Murray | Oct. 17, 1933 |
| 2,255,470 | Matthews | Sept. 9, 1941 |